(12) United States Patent
Brix et al.

(10) Patent No.: US 8,496,815 B2
(45) Date of Patent: Jul. 30, 2013

(54) IODINE RECOVERY SYSTEMS

(75) Inventors: Terry Brix, Vida, OR (US); James Reynolds, Denver, CO (US)

(73) Assignee: Iofina Natural Gas, Inc., Greenwood Village, CO (US)

( * ) Notice: Subject to any disclaimer, the term of this patent is extended or adjusted under 35 U.S.C. 154(b) by 106 days.

(21) Appl. No.: 12/563,992

(22) Filed: Sep. 21, 2009

(65) Prior Publication Data

US 2010/0074836 A1    Mar. 25, 2010

Related U.S. Application Data

(60) Provisional application No. 61/098,612, filed on Sep. 19, 2008.

(51) Int. Cl.
*C02F 1/28* (2006.01)
*C02F 1/76* (2006.01)

(52) U.S. Cl.
USPC ...... 210/170.07; 210/192; 210/199; 210/202; 210/241; 210/251; 210/254; 210/257.1; 210/258; 210/259; 210/282; 210/502.1; 166/357

(58) Field of Classification Search
USPC ............... 210/170.07, 181, 182, 192, 199, 210/202, 205, 241, 257.1, 258, 259, 502.1, 210/660, 668, 669, 747.8, 754, 756, 758, 210/251, 254, 282; 423/501–503; 166/266, 166/267, 357
See application file for complete search history.

(56) References Cited

U.S. PATENT DOCUMENTS

| | | | |
|---|---|---|---|
| 1,944,423 A | 1/1934 | Girvin | |
| 2,009,956 A * | 7/1935 | Chamberlain et al. | 423/503 |
| 2,676,092 A | 4/1954 | Allen | |
| 3,258,069 A | 6/1966 | Hottman | |
| 3,783,943 A * | 1/1974 | Schievelbein et al. | 166/266 |
| 4,049,548 A * | 9/1977 | Dickerson | 210/96.1 |
| 4,131,645 A | 12/1978 | Keblys et al. | |
| 4,203,835 A | 5/1980 | Tagashira et al. | |
| 4,378,293 A * | 3/1983 | Duke | 210/282 |
| 4,428,200 A * | 1/1984 | McCabe et al. | 60/641.5 |
| 4,461,711 A | 7/1984 | Behrens | |
| 4,596,648 A | 6/1986 | Sweeney | |
| 4,769,154 A * | 9/1988 | Saylor et al. | 210/707 |
| 4,804,477 A | 2/1989 | Allen et al. | |
| 4,844,817 A | 7/1989 | Flanigan et al. | |
| 7,527,727 B2 * | 5/2009 | Parke | 210/96.1 |
| 2006/0249454 A1 * | 11/2006 | Staschik | 210/631 |
| 2007/0102359 A1 | 5/2007 | Lombardi et al. | |
| 2010/0119438 A1 * | 5/2010 | Becker et al. | 423/501 |
| 2011/0110846 A1 * | 5/2011 | Schneider | 423/501 |

* cited by examiner

*Primary Examiner* — Matthew O Savage
(74) *Attorney, Agent, or Firm* — Pillsbury Winthrop Shaw Pittman LLP

(57) ABSTRACT

Systems and methods for the recovery of iodine are described. In particular, recovery systems and methods produce an iodine complex from an aqueous brine containing iodide. A head tank for maintains a supply of the brine, a pH controller acidifies brine received from the head tank and an oxidizer converts iodide in the acidified brine to elemental iodine. At least one activated carbon contactor module is removably inserted into a stream of the oxidized brine provided by the oxidizer and binds the molecular iodine to form the iodine complex. A container may enclose the head tank, the pH controller and the oxidizer in order to facilitate transportation of the system and performance of the methods and processes in proximity to a brine source. The brine may be employed or associated with oilfield operations.

31 Claims, 5 Drawing Sheets

IODINE RECOVERY SYSTEMS

The present application claims priority from U.S. Provisional Patent Application No. 61/098,612 filed Sep. 19, 2008, entitled "Iodine Recovery Systems And Methods," which is hereby and expressly incorporated herein by reference and for all purposes.

BACKGROUND OF THE INVENTION

1. Field of the Invention

The present invention relates generally to iodine extraction and more particularly to systems and methods for in situ extraction of iodine from gas and oilfield brines.

2. Description of Related Art

Conventional systems and methods of extracting iodine operate on brines that are substantially free of hydrocarbon contaminants. These systems generally use blowout technology (air oxidation and chlorine replacement of iodine), carbon adsorbent technologies and ion exchange resins to recover molecular iodine from brine extracted from aquifers. The resins employed are typically intolerant of high temperatures and can be quickly rendered ineffective by hydrocarbon fouling. Consequently, commonly used processes are ineffective for extracting iodine from hydrocarbon contaminated brine encountered in oilfields.

Conventional systems, particularly blowout systems, are also immobile and ill-suited for deployment in oilfields where the source of brine may be changed as operations move between re-injection wells as wells are depleted or closed for market reasons. Use of conventional systems for iodine extraction would require the transportation of significant quantities of brine from various locations in the oilfield to the processing site, extraction of iodine and return of the brine to the oilfield. Further regulations may limit brine removal to distant locations. Efficiency of conventional systems is further limited when exposed to more difficult oilfield brines, necessitating new approaches.

BRIEF SUMMARY OF THE INVENTION

Certain embodiments of the invention provide mobile modular iodine recovery systems and methods for producing an iodine complex from an aqueous brine containing iodide. Some of these embodiments comprise a head feed tank for maintaining a supply of the brine, a pH controller that acidifies brine received from the head tank to a desired acidity, an oxidizer that converts iodide in the acidified brine to molecular iodine and at least one activated carbon contactor module, which may comprise an easily removed cartridge, that is inserted into a stream of oxidized brine provided by the oxidizer, wherein the at least one activated carbon contactor module binds the molecular iodine to form the iodine complex. The contactor can be transported together with its iodine loaded adsorbent. The iodine-loaded adsorbent may also be flushed from the contactor for slurry transport by truck or other means. In some embodiments, the loaded iodine adsorbent can be eluted in situ. In some of these embodiments, the contactor includes an inflow port that provides a coupling to the head tank and/or to a flow of brine from the oilfield and a second port for returning iodide-depleted brine through a re-injection well of the oilfield directly or through a second depleted brine head tank.

Certain embodiments provide systems perform methods according to certain aspects of the invention to produce an iodine complex from an aqueous brine containing iodide. In some embodiments, systems comprise a head tank for maintaining a supply of the brine. Some of these embodiments further comprise a pH controller that acidifies brine received from the head tank to a desired acidity. Some of these embodiments further comprise an oxidizer that converts iodide in the acidified brine to molecular iodine. Some of these embodiments further comprise at least one activated carbon contactor module removably inserted into a stream of oxidized brine provided by the oxidizer. In some of these embodiments, the activated carbon contactor modules bind the molecular iodine to form the iodine complex. In some of these embodiments, the stream of oxidized brine is eventually returned to a depleted brine head tank for oil and gas field re-injection.

In some of these embodiments, the head tank is coupled to an oil well that supplies the brine to the head tank. In some of these embodiments, the head tank is coupled to a re-injection well through which iodide-depleted brine is returned. In some of these embodiments, a desired rate of flow of brine is maintained through the pH controller, the oxidizer and the at least one activated carbon contactor module. In some of these embodiments, the desired rate of flow of brine is maintained by one or more pumps. In some of these embodiments, the pH controller, the oxidizer and the activated carbon contactor modules are provided in a plurality of tanks. Some of these embodiments further comprise a re-injection pump that pressurizes the iodide-depleted brine for return through the re-injection well. In some of these embodiments, the brine includes residual organics may contain residual crude oil. In some of these embodiments, the residual organics contain residual crude oil, immiscible low molecular weight hydrocarbons and dirt/oil sludges. In some of these embodiments, the desired acidity is characterized by a pH value of about 3.

DETAILED DESCRIPTION OF THE INVENTION

Figure 1:
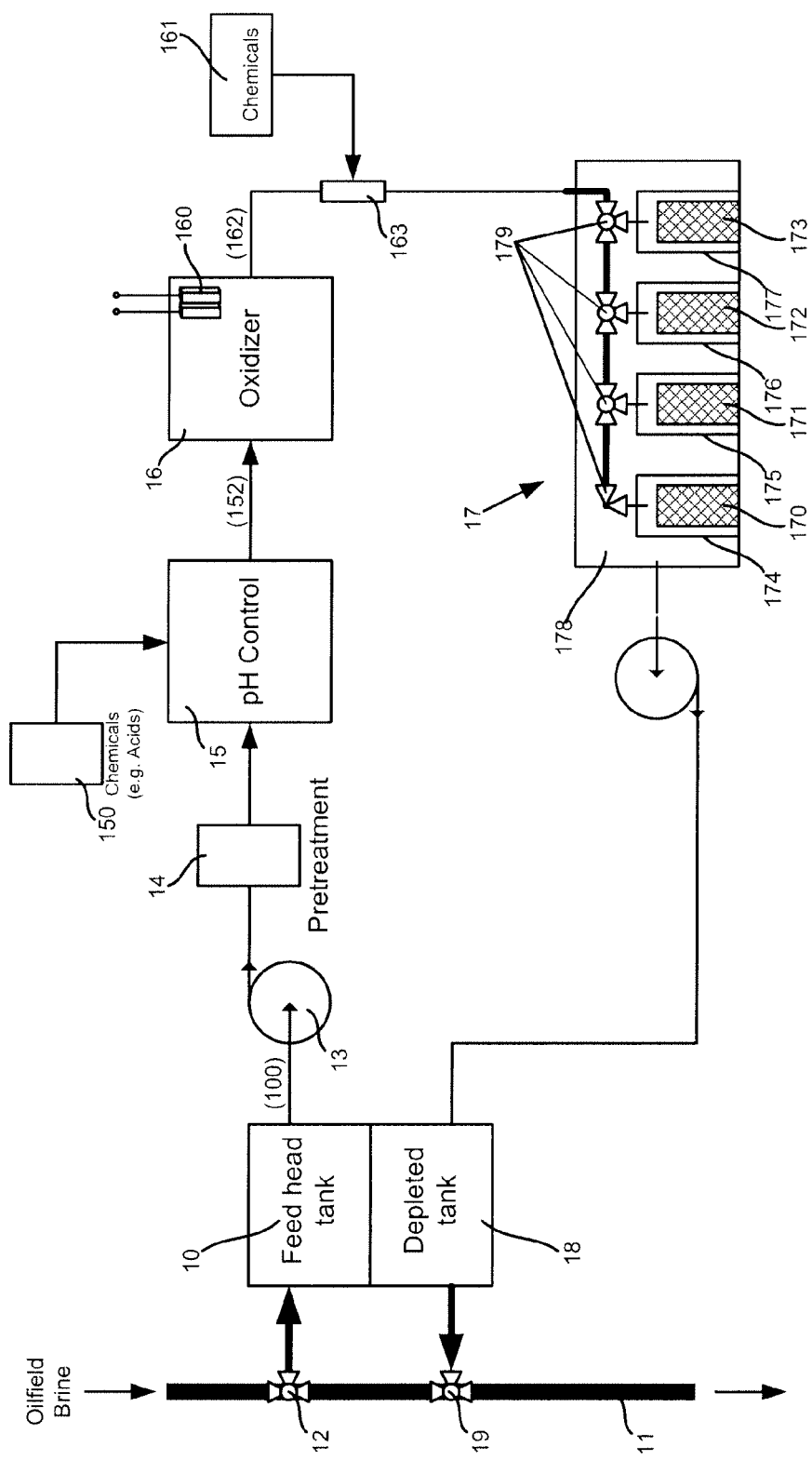
FIG. 1 is a schematic illustrating a system according to certain aspects of the invention.

Embodiments of the present invention will now be described in detail with reference to the drawings, which are provided as illustrative examples so as to enable those skilled in the art to practice the invention. Notably, the figures and examples below are not meant to limit the scope of the present invention to a single embodiment, but other embodiments are possible by way of interchange of some or all of the described or illustrated elements. Wherever convenient, the same reference numbers will be used throughout the drawings to refer to same or like parts. Where certain elements of these embodiments can be partially or fully implemented using known components, only those portions of such known components that are necessary for an understanding of the present invention will be described, and detailed descriptions of other portions of such known components will be omitted so as not to obscure the invention. In the present specification, an embodiment showing a singular component should not be considered limiting; rather, the invention is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the components referred to herein by way of illustration.

Certain embodiments of the invention provide systems and methods for recovering iodine from an aqueous brine. The term "iodine" as in the phrase "iodine recovery system" is used to refer to the iodine element in various oxidation states. Accordingly, the phrase "iodine recovery system," as employed in the present application, includes processes in which iodine occurs as elemental iodine and iodide. Iodide can be transformed by chemical manipulation to molecular iodine and by processes for the recovery of iodine in the form of iodate ($IO_3^-$), wherein iodine has a formal oxidation state of (V) in iodate. Iodine, iodide, iodate and other forms may be recovered by the iodine recovery system, as will be described below.

The term "iodine complex" as used herein refers to a combination of molecular iodine ($I_2$) and/or iodide with an agent or material which binds molecular iodine. Examples of agents which bind molecular iodine include ion exchange resins, charcoal and activated carbon. The amount of iodine which forms a complex is referred to herein as "carbon loading." Theoretical iodine capacity varies with carbon source and purity. For example, in Filtersorb 400 activated carbon, the maximum carbon loading typically occurs with 800 grams iodine per kilogram of carbon.

The term "aqueous brine," as used herein, refers to any water-based solution or concentrated slurry of salt comprising iodide. Salts in aqueous brines consist chiefly of sodium chloride but may include other salts. Aqueous brines may be found naturally as in the example of Oklahoma gas-brine wells and re-injection oil wells. Naturally occurring aqueous brines also occur in Japan and in California. Aqueous brines may also occur as seawater or concentrated seawater including seawater that occurs during or as a result of saltwater salination.

The term "residual organics," as used herein, refers to non-aqueous organic residues present in aqueous brines. One example of residual organics is residual crude oil, suspended hydrocarbons and dirt/oil sludges or a combination thereof. Residual organics pose potential problems by fouling resins and/or carbon contactor modules.

The term "electro-chlorination," as used herein, refers to a process, which produces chlorine on demand. Thus a system according to certain aspects of the invention may carry little or no inventory of chlorine. Electro-chlorination provides one method of supplying chlorine to remote wellhead sites for iodine recovery in certain embodiments of the present invention.

The pH value of aqueous brines can be adjusted to enhance the conversion of iodide to elemental iodine, thereby enhancing the recovery process. Conversion of iodide to molecular iodine is an oxidative process that can be effected electro-chemically or by a variety of chemical oxidants. In basic aqueous solution, facile over-oxidation of iodide can occur, leading to iodate, $IO_3^-$. According to the present invention, oxidation is conducted either electrochemically or chemically in acidic solution. Conversion of iodide to elemental iodine in acidic aqueous solution significantly inhibits the formation of iodate with little or no effect on the conversion yield of iodide to molecular iodine.

In certain embodiments of the invention, aqueous brine is treated by initial acidification with metered hydrochloric or sulfuric acid and mixed with an in-line static mixer. Brine pH can be controlled by either ratio-control or pH-control to about pH 3.5. Well brine pH may be buffered by its bicarbonate content which can increase the amount of acid needed to lower the pH value to about pH 3 prior to chlorination of the iodide content to form elemental iodine. Bicarbonate content of recovery well brine varies, but can be very high at about 1300 ppm. Certain brines are relatively consistent; for example, relative proportions of bicarbonate and iodide in Oklahoma and Japanese brines can be about the same, i.e., about 5 to 1.

The pH of aqueous brine solutions can be controlled with a pH controller that achieves a desired acidity by acidifying brine received into the system from a brine tank, directly from a well or from another source. Certain embodiments of the invention employ an activated carbon contactor module to capture, store, transport and release adsorbed elemental iodine. The carbon contactor module typically comprises charcoal and/or activated carbon which binds elemental iodine. The activated carbon used in carbon contact module may be chemically treated to improve Iodine extraction performance. In one example, carbon may be saturated with chlorine prior to immersion in the brine. Based on the characteristics of the carbon used, content of the brine and rate of flow of brine through the activated carbon contactor module, the carbon may be initially treated with ammonia before saturation with chlorine.

The formation of an iodine complex is reversible, thus affording methods to release and recover elemental iodine, as well as recycling the charcoal or activated carbon. In one embodiment, adsorbed iodine may be reduced to iodide. Standalone iodine extraction systems can include a regeneration capability for activated carbon. Typically, activated carbon is regenerated after elution of adsorbed iodine. As part of the regeneration process, reactivated carbon may be pre-treated with ammonia and saturated with chlorine using chemicals produced on-site. As discussed herein, chlorine can be obtained directly from sodium chloride present in the brine. In some embodiments, an additional module may be provided for generating ammonia.

Aqueous brine can be used as the source of chloride ion in electrochlorination used according to aspects of the invention. In one example, aqueous brine from some Oklahoma wells typically contains about 14 g/L of NaCl a concentration that, although about one-half that of sea water, is nevertheless sufficient to feed an electrochemical cell. Under applied potential, free chlorine evolves at a dimensionally stable anode ("DSA") that may be coated with titanium, while and hydrogen is produced at a stainless steel cathode with the overall reaction:

$$NaCl+H_2O+2e^-=Cl_2+NaOH$$

The two electrode products react to form hypochlorite bleach, NaOCl. If brine containing iodide is used as the electrolyte, chlorine evolved at the anode surface reacts immediately with iodide ion:

$$Cl_2+2I^-=I_2+2Cl^-$$

Theoretical chlorine production is 1.32 g chlorine/amp-hour. Iodide oxidation requires 0.28 g $Cl_2$/g $I_2$.

Electrolysis may also be used for production of iodine in a standalone iodine extraction system. Loaded carbon can be used as a cathode in an electrolytic process that has NaCl or HI as an electrolyte and in one example, carbon rod anodes. Carbon adsorbed to the cathode is converted to HI in the presence of a current and is then reduced at the anode to iodine which can be crystallized from the electrolyte. Meanwhile, $H_2$ is produced at the cathode. Upon extraction of the iodine, the carbon at the cathode can be processed for reuse in an activated carbon contactor module.

Certain embodiments of the invention provide systems and methods for modular iodine recovery and for producing an iodine complex from aqueous brine. Modular, self-contained transportable systems may be deployed at any desired location on a temporary or long-term basis. With reference to FIG. 1, a system in accordance with certain aspects of the invention typically comprises a feed head tank 10 that maintains adequate supplies of brine 100. Head tank 10 may maintain supply of brine 100 at a desired pressure and temperature. Head tank 10 may be provided as an external module relative to the other components of the system and may comprise a tank for collecting brine that can feed an iodine recovery system under gravity or through pumping.

Feed head tank 10 may include a bypass mechanism 12 and 19 that permits the head tank 10 to capture a portion of brine passing through a channel or pipe 11. For example, pipe 11 may feed a re-injection well or carry brine from an oil well. In certain embodiments, it may be advantageous to remove at least some of the hydrocarbon content and other contaminants in the brine. To this end, a pretreatment process may be used to obtain hydrocarbon removal in a pretreatment module 14 that is typically located after the head tank 10 and between pump 13 and downstream pH adjustment 15. In one example, pretreatment module 14 comprises a column filled with activated carbon that filters suspended solids and adsorb soluble organic compounds. Treatment with sulfuric acid and/or other chemicals may also serve to reduce contamination of the brine. In some embodiments, mechanical methods for removing hydrocarbons are used including, for example, hydro-cyclones which are discussed in more detail below.

In certain embodiments, feed head tank 10 supplies one or more tanks, containers and reaction chambers with aqueous feed brine 100. Aqueous brine 100 may flow under the force of pressure achieved in feed head tank 10, although flow may be assisted using one or more pumps 13 or limited by pressure reducers (not shown). Typically, pretreated aqueous brine passes through chamber 15 in which acidity of the brine is monitored and adjusted. Pretreatment may include hydrocarbon removal as described above, temperature control, pressure control and chemical processing selected according to the composition and characteristics of feed brine 100. Chamber 15 (also referred to herein as "pH controller 15") may control acidity using combinations of acids and bases as necessary or desired. A stirring mechanism may be deployed in, or adjacent to, chamber 15. Stirring mechanism can comprise a propeller, vanes and other mixing devices as desired in order to ensure proper mixing of the brine with added acids and other chemicals 150. The use of static mixers offers certain advantages.

Typically, acid is added to decrease pH value of the brine to a desired level, although it may be necessary to compensate for over-acidification. In certain embodiments, acid such as sulfuric acid may be introduced to the aqueous brine in chamber 15 from a holding tank 150. In some applications, it may be desirable instead to use hydrochloric acid derived from the aqueous brine 100, as described in more detail below. The choice of acid used in pH controller 15 may be driven by various factors, including cost, composition of the brine, ecological concerns and regulatory requirements.

The pH-controlled/acidified brine 152 may then be oxidized. Oxidation is typically performed in an oxidation chamber 16 that enables conversion of iodide in acidified brine 152 to elemental iodine. Oxidation may be accomplished electrochemically using electrodes 160 or through the use of a bleach such as sodium hypochlorite. In certain embodiments, chlorine is produced electrochemically in order to oxidize the acidified brine. Generation of chlorine may be performed within the oxidation chamber 16. Chlorine may also be generated separately from the oxidation chamber 16 and introduced to the oxidation chamber 16 as required.

In certain embodiments, additional processing may be performed after electrochlorination or bleach addition. Additional processing can include the addition of one or more chemicals 150 such as sodium nitrite or nitrous acid, which may be added to minimize the reconversion of carbon adsorbed elemental iodine to iodide. It will be appreciated that certain chemicals 150 may be introduced after or before pH Controller 15 in order to adjust one or more characteristics of acidified brine 152. Likewise, it may be appropriate to introduce and/or mix at 163 other chemicals 161 to oxidized brine 162. It is contemplated that the use of chemicals 150 and 161 can be automatically controlled in response to sensors monitoring content of brine flows and other aspects of the system.

In certain embodiments, the system can be equipped with one or more iodine extraction modules 17 that can be connected to the oxidized brine generated by the oxidation chamber 16. Connection of an iodine extraction module 17 to the brine flow permits the brine to pass through and over one or more bodies of activated carbon 170-173. Activated carbon 170-173 may be provided in a structure such as a fixed bed, fluidized bed, a slurry, a sponge, a honeycomb, a tower of carbon or in any other arrangement selected to optimize contact between iodine and activated carbon 170-173. The iodine extraction modules 17 can be constructed to have a removable cartridge 174-177 that includes an element housing or attaching the activated carbon structure 170-173. Removable cartridge 174-177 can be received by and attached to a generally hollow chamber 178 which is connected to the flow of brine provided by the oxidation chamber 16. Flow of brine through hollow chamber 178 may be disabled during attachment and detachment of the removable cartridge 174-177. Flow may be controlled by one or more valves 179.

In one example, flow of brine may be bypassed from a first module 174 (e.g.,) to another module 175, 176 and/or 177 in order to remove and/or replace removable cartridge 174 in a batch-continuous process. At any point in the process, some modules 17 and/or cartridges can be adsorbing, some may be disconnected from the brine flow after maximum and/or threshold adsorption to enable removal and/or replacement and some can be regenerated in situ. In the example, enabling brine flow causes brine to flow from hollow chamber 178 and may further cause the brine to contact activated carbon 170-173 such that iodine is adsorbed by the activated carbon 170-173. As iodine accumulates on the activated carbon 170-173, adsorption rate may begin to decrease. The flow of brine may be stopped after a sufficient quantity of iodine has been adsorbed by the activated carbon 170-173. This sufficient quantity may be determined as a threshold indicating an amount of adsorbed iodine that can be practicably and economically removed and/or indicating a point after which a diminishing return is obtained in the adsorption step. The removable cartridge 174-177 can then be removed from iodine extraction module 17 for elution of the resultant iodine-carbon complex and a fresh activated carbon element can be connected to the system. In this manner the activated carbon 170-173 elements can be recycled. Removable cartridges can be reactivated in a separate process and/or location and, in some embodiments, in situ. Accordingly, elution and regeneration can also be done in situ in the individual cartridges. However, it is contemplated that reactivation may be accomplished by physically moving cartridges off-site. In one alternative embodiment, a slurry comprising loaded iodine and carbon can pumped from a removable/non-removable cartridge 174-177 as a slurry for transport by truck (for example) to an off-site regeneration facility.

Certain brines have elevated salt content and, therefore, elevated chloride ($Cl^-$) levels which can react with iodine adsorbed on the activated carbon converting the adsorbed iodine into iodide as an example, thus reducing recovery. Accordingly, one or more chemicals may be added to prevent reaction between chloride in the brine and adsorbed iodine; these chemicals may include nitrites such as sodium nitrite, nitrous acid and/or other chemicals. In one example, nitrites can be added after pH adjustment and/or after manipulation of oxidation-reduction potential.

In certain embodiments, plural iodine extraction cartridges 174-177 may be provided in the system together with a system of flow controls 179 that permit the flow of brine to continue while some of activated carbon 170-173 is replaced. In one example, two sets of iodine extraction cartridges 174/175 and 176/177 may be provided with flow controls 179 configured to switch brine flow between the two sets of iodine extraction cartridges 174/175 and 176/177 based on which set of iodine extraction cartridges 174/175 or 176/177 is to be replaced. Thus activated carbon 170, 171 in one set of iodine extraction cartridges 174, 175 can be replaced while flow is directed to the other set of iodine extraction cartridges 176, 177.

Spent brine can be returned from iodine extraction module 17 to a depleted brine head tank 18. In certain embodiments, the spent brine may be pumped directly into a brine outflow line for reinjection. Where a relatively small portion of the total available brine flow is processed for iodine extraction, spent brine and be mixed with unprocessed brine and reinjected. It is contemplated that, in some embodiments, a simplified head tank system can be employed, whereby a portion of the spent brine can be returned from iodine extraction module 17 to a head tank from which brine feed 100 is drawn. In one example, spent brine with a residual iodide content may be blended with higher incoming brine to optimize iodide content, or average iodide content, for optimal extraction. In another example, a constant flow of brine through a common head tank maintains the concentration of iodine in brine feed 100, at levels suitable for iodine extraction.

Figure 2:
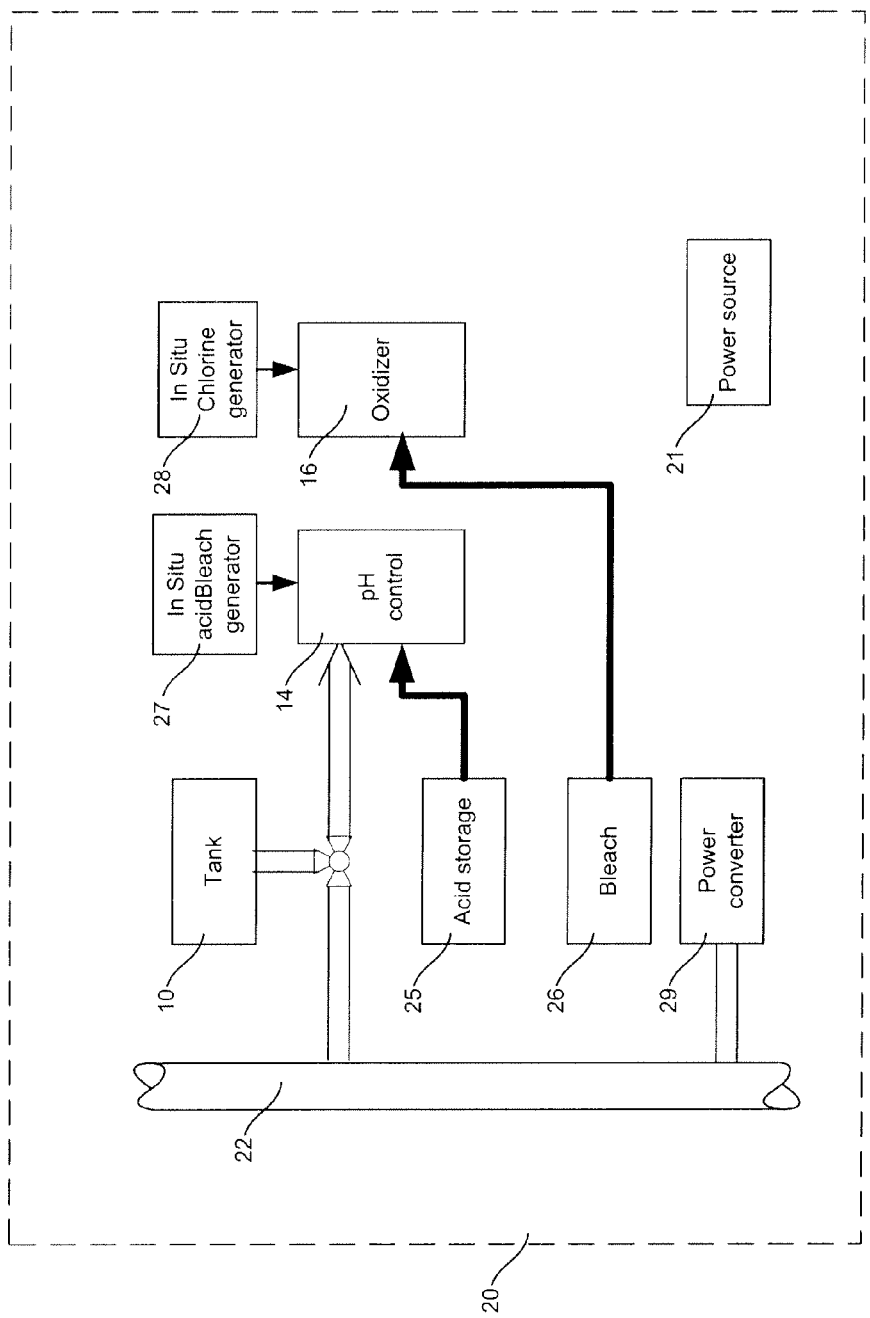
FIG. 2 is a block diagram illustrating certain components according to aspects of the invention.

With reference to FIG. 2, in certain embodiments, an iodine extraction system can be provided in a compact self-contained container 20 or in a plurality of separate containers (not shown) that can be interconnected for operation. Container 20 typically holds a plurality of selectable modules arranged and configured for mobility and/or ease of transportation. Container 20 may be a standard inter-modal container such as International Organization for Standardization (ISO) defined containers that can be loaded and sealed intact onto container ships, railroad cars, planes, and trucks. Other containers 20 may be customized according to a preferred mode of transport or hauling and may be an integral part to a truck or other vehicle.

FIG. 2 depicts a portion of a transportable system comprising several selectable and optional modules housed in container 20. Iodine extraction systems can be provisioned based on application requirements, availability and accessibility of reactants and other factors. For example, transportable container or skip unit 20 may house different modules that can be connected and/or selectively enabled to suit the application at hand. Containerization enables easy transport of iodine extraction systems to brine sources. Container 20 may be loaded on a trailer or may be embodied in a vehicle that may be towed, skid-mounted or self-propelled. In certain embodiments, couplings are provided on the container 20 to allow easy connection of the iodine extraction systems to a source of brine 22 and to provide an outflow for spent brine. In a multi-container system, containers may be transported together or independently and connected using couplings. Consequently, the system maybe easily transported to a point proximate to a brine flow and can be connected and/or inserted into the brine flow.

It is contemplated that systems can be scaled to obtain a desired throughput, to add additional processing steps and to accommodate differences in brine characteristics and brine extraction/re-injection requirements. Accordingly, mobile units can be designed such that one system consists of plural mobile subsystems that can be connected to construct a complete integrated system. Thus, a system can be transported in a single container or in multiple containers based on system requirements and other factors such as terrain and mode of transportation.

In certain embodiments, a head tank 10 may be optionally included in container 20. Head tank 10 may be used if no external head tank or other flow control mechanism is available at the iodine extraction site. Acid storage 25 may hold sulfuric and/or hydrochloric acid for pH control 15. It is contemplated that a sodium hydroxide storage (not shown) may also be carried for pH control 15 and for other purposes. Where necessary or desirable, hypochlorite may be made in situ using generator 27. Alternatively a separate supply of bleach or chlorine may be stored in tank 26 for metering into the oxidizer 16. In certain embodiments in situ chlorine generation 28 may supplant the bleach and may be used in certain operations.

A portion of brine 22 may be diverted to power generator 29 which advantageously extracts energy from the brine 22 as will be described in more detail below. Power source 21 may augment other internal or external power supplies such as grid electricity, batteries, fuel cells, solar panels, generator etc. Power source 21 may operate as either primary or alternative source of power for the system.

In certain embodiments, the external flow of brine may be received from an oil well. Consequently, container 20 may include, or be attached to, a filtering or other hydrocarbon extraction component 25 for removing a portion of hydrocarbons present in the brine. In an oil field, extracted hydrocarbons may be of sufficient quantity to warrant collection in a tank for further recovery, processing and refining.

Certain embodiments of the invention permit apparatus to be mounted on, attached to, or otherwise incorporated in a vehicle that permits deployment proximate to a brine source as desired. Such mobile apparatus may be used for extraction of brine from an accumulation reservoir, for testing of brines and for other reasons. In one example, a system was constructed such that equipment is mounted in a 26 foot long, wide-body trailer that allows the system to be easily transported between selected re-injection wells.

Certain embodiments overcome issues and disadvantages common in conventional systems and methods of iodine extraction. Conventional systems typically suffer from resin loss of loading capacity, organic fouling, visual and measured effect on ion exchange resin stickiness, retention of suspended solids on carbon beds, electrode fouling, as well as stability and reliability. Aspects of the present invention enable automatic pH and oxidation reduction potential ("ORP") process control and improve efficiencies of electro-chlorinator operation (current and voltage efficiencies). Furthermore, certain embodiments enable performance of analytical procedures and support methods of extraction that include ISE electrode iodide titration and up-flow, fluidized operation in addition to down-flow operation.

Automatic process control of pH and ORP (i.e., oxidation of brine with hypochlorite) can eliminate unstable control loops caused by insufficient mixing of acid and hypochlorite with the brine feed prior to contacting carbon columns. For example, the number of mixing elements in static mixer pipe spools can be adjusted and can modify mixing and pumping components to obtain stability in brine pH and ORP. Certain embodiments employ static mixers, while others include one or more short pipe spools filled with ¾-inch packing. Certain embodiments operate under manual control or under some combination of manual and automatic controls as necessary. Factors determining the degree of automatic control can include constancy of brine feed flow rate. Process control can include monitoring and adjusting stroke length and/or pulse rate of metering pumps to control flow ratio of reagents. Certain embodiments employ an inline electrode that may be used to monitor and control reagents used to pre-acidify and oxidize resin and carbon. In-line electrodes are typically installed immediately downstream of pipe line mixing spools.

Certain embodiments provide access to active and passive components for periodic cleaning and maintenance. In certain circumstances operational performance can be degraded over time including, for example, when brines are used that include significant organic content. Organic content can foul electrode probe tips, including ISE electrodes, as well as ORP platinum tipped probes and sintered glass pH probe ends. Although electrode cleaning techniques may be employed periodically to maintain performance levels, brine flow may be disrupted by cleaning and/or replacement of in-line electrodes. Therefore, certain embodiments include submersible probes suspended in an agitated tank for brine pre-treatment to address the problems discussed above and reduce or eliminate fouling, post-gassing of $CO_2$ bubbles and to improve pH and ORP stability.

According to certain aspects of the invention, systems and methods may be embodied in modular, self-contained and transportable systems. Transportable systems may facilitate iodine extraction at remote and/or changeable iodine systems. In certain embodiments, power source 21 may comprise internal and external sources. For example, certain brine sources deliver a brine flow from which energy may be extracted to power the iodine extraction system. It will be appreciated that power generation from the brine flow may be augmented by conventional generators, solar cells, batteries and from other sources. Power generation may produce electrical energy that can directly power the iodine extraction system and, in at least some embodiments, electrical energy may be stored using batteries, capacitors, kinetic storage systems, fuel cells and so on. Additionally, heat extracted from the brine source can be used as needed to control temperature of reactants in the iodine extraction system.

Figure 3:
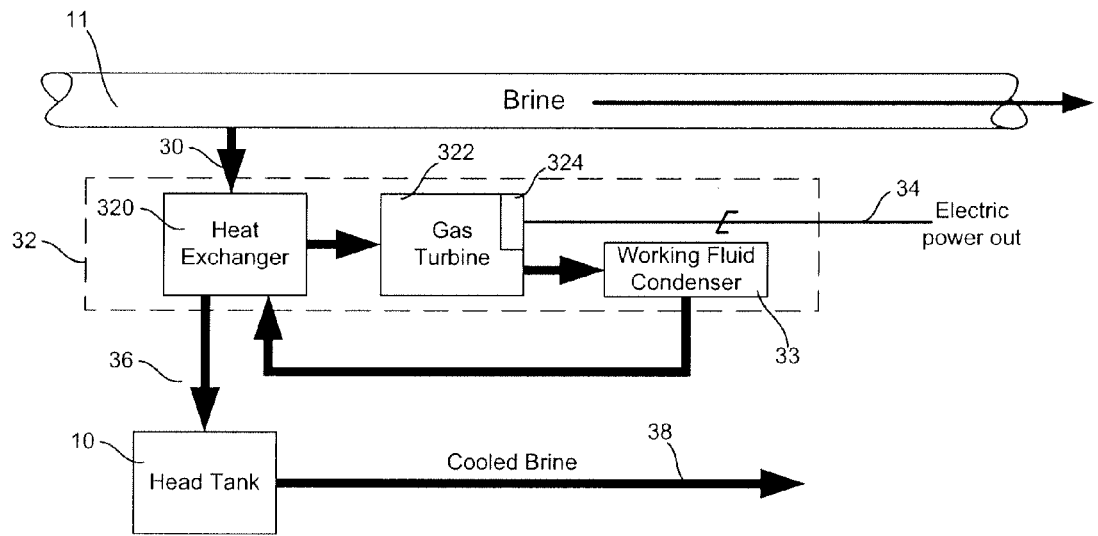
FIG. 3 is a block diagram illustrating power conversion performed in certain embodiments of the invention.

An example of power extraction is provided in FIG. 3. In this example, brine 11 is provided for iodine extraction at an elevated temperature. Temperatures of the brine 11 may range from 50° C. to 80° C. and the temperature is preferably reduced to facilitate the iodine extraction processes described above. Therefore, in the example, a tap 30 diverts a portion of the brine 11 and provides the diverted brine to a heat exchanger 320 to produce a brine portion 36 having a reduced temperature. This brine portion 36 may be provided to head tank 10 in order to provide a desired pressure of cooled brine feed 38 to the iodine extraction system. In certain embodiments, heat exchanger 320 may provide a cooled brine 38 directly to the iodine extraction system, typically by controlling flow of brine to the heat exchanger 320 using tap 30.

Heat exchanger 320 can be a component of power generator 32. Power generator 32 may comprise aforementioned heat exchanger 320 and a turbine 322. As depicted in the example, a gas turbine 322 may be employed in which a working fluid with a low boiling point absorbs heat in the heat exchanger to convert the liquid working fluid to a pressurized gaseous state which is fed to gas turbine 322. Gas turbine 322 employs an energy exchange that condenses the fluid to liquid form and produces rotational energy in gas turbine 322. This rotational energy may be converted to electrical energy using a generator or dynamo 324 as appropriate to generate electrical output 34. The working fluid may then be condensed using condenser 33. Suitable working fluids include isopentane, ammonia/water combinations, low boiling organics and so on. Selection of fluids used in the heat exchange process is typically driven by the operating temperatures of the power generation subsystem described.

Figure 4:
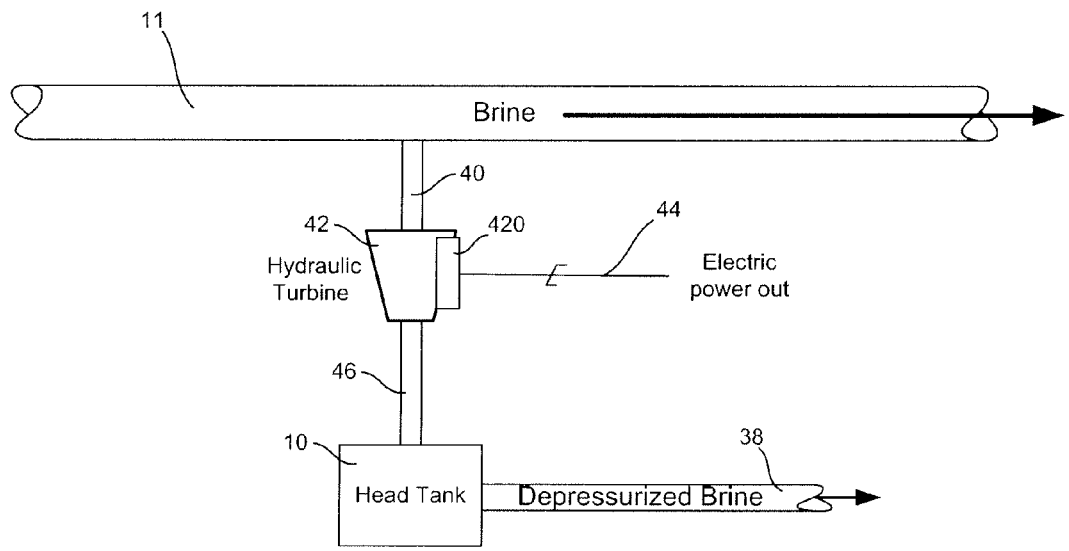
FIG. 4 is a block diagram illustrating power conversion performed in certain embodiments of the invention.

Another example of power extraction is provided in FIG. 4. In this example, brine 11 is received from a well at elevated pressure. A tap 40 diverts a portion of the brine 11 and provides the diverted brine to a turbine 42. Turbine 42 drives a generator or dynamo 420 to produce electrical power 44. Turbine 42 transmits a reduced pressure brine 46 to the iodine extraction system. Reduced pressure brine 46 may be fed directly to the iodine extraction system or may be delivered to head tank 10.

It is contemplated that a mobile iodine extraction is likely to encounter brines having combinations of elevated pressures and temperatures. Consequently, certain embodiments can be configured to extract energy from brine using any combination of heat exchange and direct drive turbines. Moreover, excess electrical energy can be stored in batteries and/or fuel cells and can be used to generate hydrogen (whether or not electrolytic extraction is employed) for use in a combustion engine/generator combination.

Figure 5:
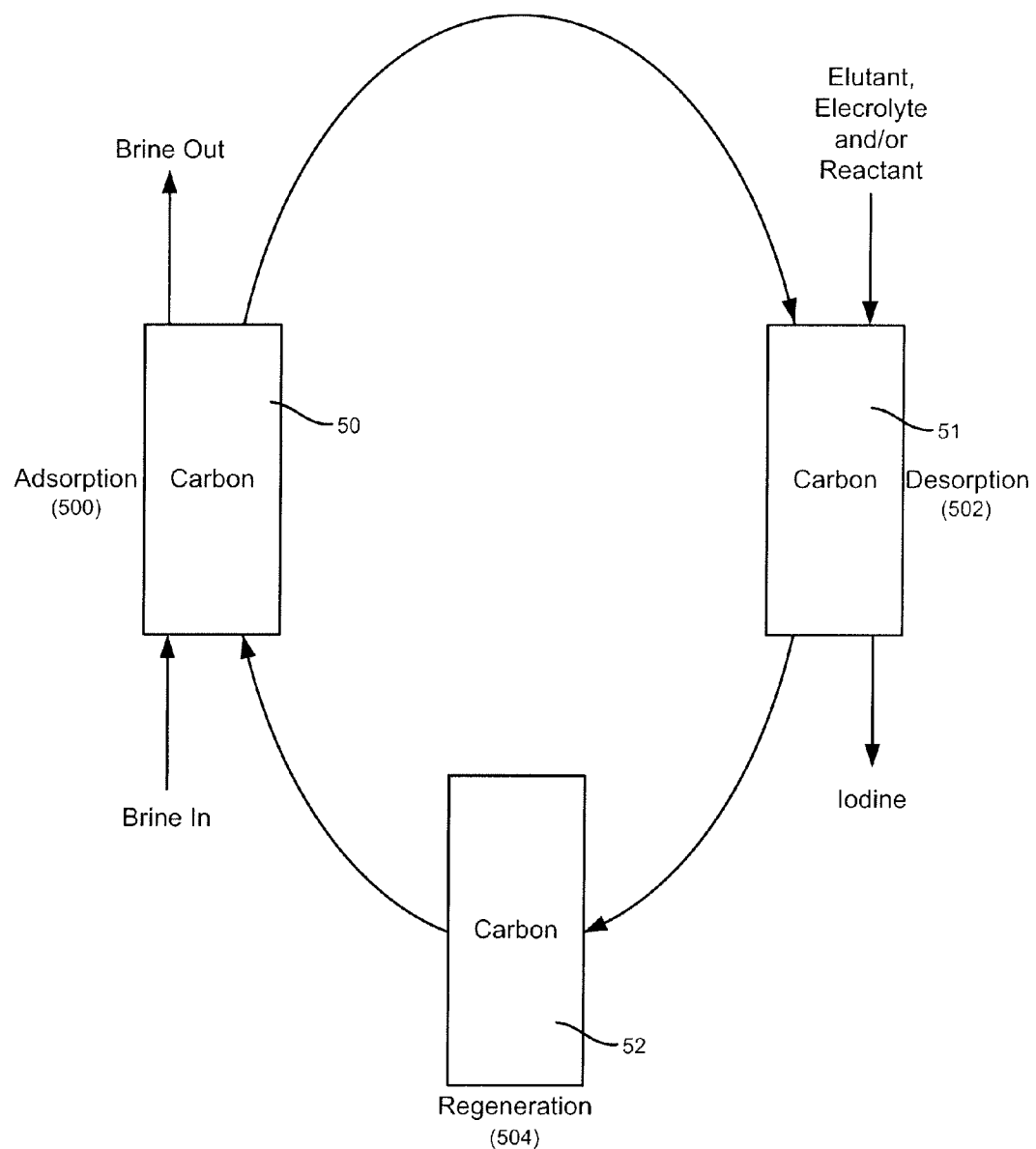
FIG. 5 is illustrates a regeneration cycle according to certain aspects of the invention.

FIG. 5 illustrates a carbon regeneration cycle employed in certain embodiments of the invention. Three activated carbon contactor modules 50-52 are depicted for the purposes of illustration. In the adsorption phase 500 carbon contactor module 50 is shown in direct contact with treated brine from which Iodine is adsorbed to the contact surface of activated carbon contactor module 50. At some point, efficiency of adsorption is degraded when available adsorption sites are depleted and elution of the accumulated Iodine is required. In the desorption phase 502, iodine and/or iodine compounds may be separated from activated carbon contactor module 51. Separation can be accomplished by one or more of elution, electrolysis and other chemical processes. Carbon contactor module 52 may then be subjected to a regeneration phase 504, which can include removing contaminants from activated carbon contactor module 52, as well as ammoniating and chlorinating activated carbon contactor module 52. Other steps in the process are contemplated to account for specific needs of the process adapted and characteristics of the received brine.

The regeneration cycle of FIG. 5 can be performed manually, semi-automatically and automatically. Typical adsorption:desorption service time ratios are of the order of 50:1 or better. In one example, activated carbon contactor module 50 adsorbs iodine for 22 days (528 hours) and adsorbed iodine is removed in 8 hours or less (66:1). The use of multiple activated carbon contactor modules enables highly efficient and consistent iodine extraction capacity. In one example, a system can be constructed with eight (or more) activated carbon contactor modules 50, whereby the regeneration cycles of each of the activated carbon contactor modules 50 can be staggered with respect to one another such that only one activated carbon contactor module 50 is in desorption 502 or regeneration 504 phases at any time. Efficiency of such a system would then be approximately 97% of rated capacity.

A system can be constructed whereby multiple activated carbon contactor modules 50 are automatically continuously progressed through the regeneration cycle. In one example, computer-controlled valves can be used to selectively disconnect an activated carbon contactor module 51 or 52, removing this module 51 or 52 from the adsorption phase 500 of the regeneration cycle, and connecting the module 51 or 52 in sequence to separation phase 502 and regeneration phase 504. In another example, a continuous mass of activated carbon is progressively moved through the regeneration cycle, at least notionally, in a direction counter to the flow of brine. Thus, a portion of the carbon may be submitted to the brine flow for a period of time before entering elution and regeneration phases. In the example described above having a 66:1 adsorption:desorption ratio, 67 or more steps may be defined, whereby each portion of activated carbon spends 8 hours at each step and where 66 steps are adsorption steps while 1 step is an elution/regeneration step. It will be appreciated that such a process may be substituted for a modified Higgin's Loop similar to that used in ion exchange systems.

Figure 6:
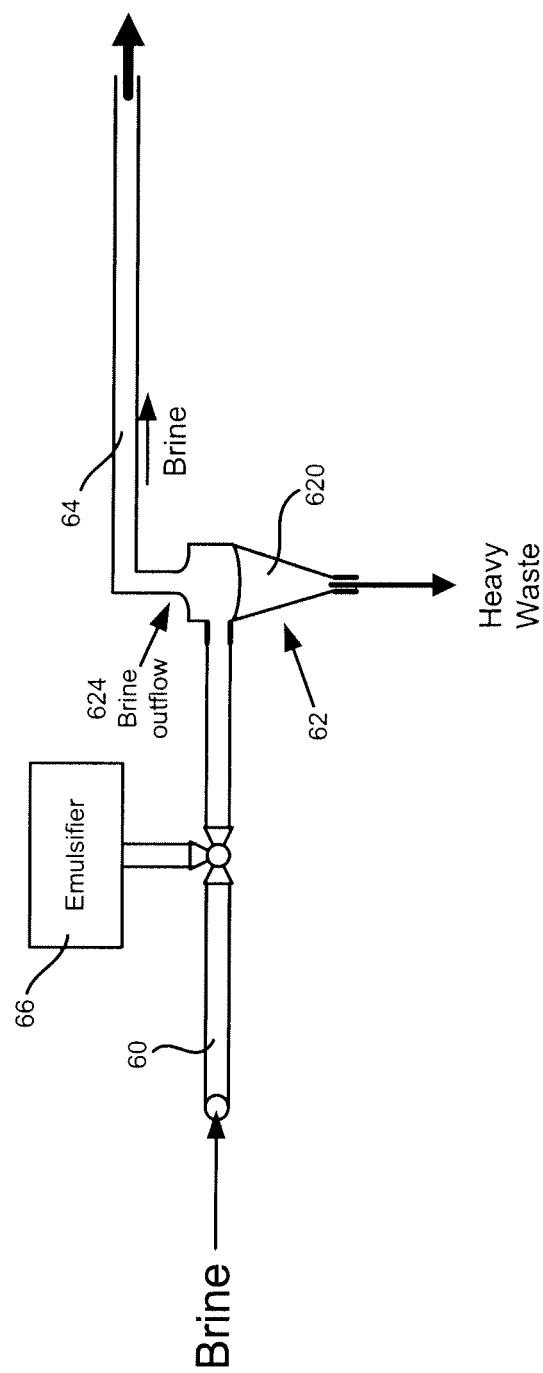
FIG. 6 is a block diagram illustrating pre-processing of brine as performed in certain embodiments of the invention.

Certain embodiments employ mechanical systems to remove heavy solids and other contaminants. Brines can include contaminants such as oil, mineral sludges and scaling, heavy metals and their oxides and other contaminants having substantial mass and volume. Such contaminants can foul the described system and interfere with the activated carbon. In the example shown in FIG. 6, a hydrocyclone 62 is employed to separate heavy solids from iodine rich brine. A brine feed 60 is provided to an inner chamber 620 of hydrocyclone 62. Fluid in the chamber is driven in rapid rotation and the centripetal forces cause heavier solids to be driven to the sidewalls and thence out the bottom 622 of the hydrocyclone 62. The lighter brine rises to the top 624 of the hydrocyclone 62 and passes through pipe 64 to be processed further. In certain embodiments an emulsifier 66 may be added to the brine to facilitate treatment and processing. Where required or desired, emulsifier 66 is added before the hydrocyclone to avoid creaming and other ill-effects that would be experienced in a centrifuge.

ILLUSTRATIVE EXAMPLES

Certain embodiments of the invention can be used to process re-injection brines originating from relatively shallow wells that typically exhibit much higher specific gravity due to higher salt content. Other wells may have a very low salt content that is measurable at about one-half that of seawater. Carbon density is typically selected based on the re-injection brine density and flow rate can be adjusted in relation to carbon density. Activated carbon may be derived from coal, a variety of biomass material such as coconut husks, nut shells, oak, etc., or a combination of sources.

Certain embodiments of the invention were deployed to verify operation of systems and methods and to obtain reference data useful in assessing viability of iodine extraction from brines obtained from various sources. In one example, a system received a feed of 2-4 gal/min of brine was pumped from a re-injection tank to a trailer, in which a system according to certain aspects of invention was deployed. The feed was metered to one of two contactors with an electronic flow meter to monitor flow rate and totalize brine flow. A six-inch diameter clear PVC column filled with activated carbon was used to filter any suspended solids and adsorb soluble organic compounds. The brine was then pre-treated by initial acidification with one or more of metered hydrochloric and sulfuric acid and mixed with an in-line static mixer. Brine pH was controlled by either ratio-control or pH-control to about pH 3.5. Next, an in-line ORP electrode was employed to provide a signal to metering pumps that caused the addition of a dilute solution of hypochlorite to oxidize iodide to elemental iodine. The hypochlorite in the example was supplied from a drum of 10% bleach solution.

An electro-chlorinator was also used in some instances. Approximately one-tenth of the spent brine was pumped to the electro-chlorinator to supply a dilute salt solution for producing chlorine at the anode while evolving hydrogen at the cathode. A DC rectifier supplied current to the cell and was adjusted based on periodic sampling of a tank. An amp-hour meter totalized the power demand.

In certain examples, a second in-line mixer produced a brine flow at a selected or predetermined pH and oxidation reduction potential ("ORP") before splitting the flow into two streams with manual setting of flows with flow indicator-totalizers. A pair of 4-inch diameter clear PVC columns was piped in series for receiving conditioned feed brine in either up-flow or down-flow configuration. At the bottom of the column, perforate PVC plates with a 35 mesh stainless screens supported a resin bed in some tests, and activated carbon in others. A similar design can be configured to maintain activated carbon or resin at the top of the columns. Spent brine overflowed column-pairs to the tank with a submerged centrifugal stainless steel pump for returning brine to the re-injection facility.

In one example, a mobile iodine extraction system was employed. The mobile iodine extraction system was constructed according to certain aspects of the invention and mounted on a mobile platform. The mobile platform comprised a trailer that could be driven to an extraction site. The trailer was typically positioned adjacent to a source of brine that is supplied to blowout towers. A brine feed with ¾-inch tubing was used to obtain a maximum flow of 5 gal/min. A 6-inch degas column CL-1 was filled with two feet of carbon. A column CL-2 1A may be filled with two feet of AAA-1 resin for down-flow operation at 0.5 gal/min (0.38 bed volume) and a carbon column CL-4 2A filled with two feet of acid washed carbon for down-flow operation at 1.0 gal/min (0.76 bed volume) pH control on auto to control pre-treated brine at pH 3-3.5 with 200 g/l $H_2SO_4$. An electrochlorinator rectifier at 40 amps DC to hold NaOCl in a hypo feed tank at 1.5-2.0 g/l.

In the examples described, columns were tested to operate at breakthrough points and acid consumption was recorded (as liters/hour). As described above, and in accordance with certain aspects of the invention, the method of extracting iodine included titrating column effluents at predetermined intervals (e.g. hour intervals) for total $I_2/I$ and obtaining ISE readings for I. In some instances, the comprised titrating column feeds, samples taken from the spent brine tank and a feed and blowout tower.

In the examples described, process variables were monitored and controlled. These variables included the degree of brine feed oxidation (iodide to iodine), which typically ranged from 66% to full oxidation. Depending on characteristics of the brine feed, pH was varied from non-adjusted pH levels ranging from 6.0-6.5 to pH level of 2.5. Column flow rate over a range of bed volumes/minute was maintained within a desired range that, in one example, extended through the range of 0.2 to 1.0.

Additional Descriptions of Certain Aspects of the Invention

Certain embodiments of the invention provide modular iodine recovery systems and methods. Some of these embodiments comprise methods for producing an iodine complex from an aqueous brine containing iodide. Some of these embodiments further comprise a head tank for maintaining a supply of the brine. Some of these embodiments further comprise a pH controller that acidifies brine received from the head tank to a desired acidity. Some of these embodiments further comprise an oxidizer that converts iodide in the acidified brine to molecular iodine. Some of these embodiments further comprise at least one activated carbon contactor module removably inserted into a stream of oxidized brine provided by the oxidizer. In some of these embodiments, the activated carbon contactor modules bind the elemental molecular iodine to form the iodine complex. In some of these embodiments, the stream of oxidized brine is eventually returned to a depleted brine head tank or directly to a brine reinjection line.

In some of these embodiments, the head tank is coupled to an oil well that supplies the brine to the head tank. In some of these embodiments, the depleted head tank is coupled to a re-injection well through which iodide-depleted brine is returned. In some of these embodiments, a desired rate of flow of brine is maintained through the pH controller, the oxidizer and the at least one activated carbon contactor module. In some of these embodiments, the desired rate of flow of brine is maintained by one or more pumps. In some of these embodiments, the pH controller, the oxidizer and the activated carbon contactor modules are provided in a plurality of tanks. Some of these embodiments further comprise a re-injection pump that pressurizes the iodide-depleted brine for return through the re-injection well. In some of these embodiments, the brine includes residual organics may contain residual crude oil. In some of these embodiments, the residual organics contain residual crude oil. In some of these embodiments, the desired acidity is characterized by a pH value of about 3.

In some of these embodiments, the desired acidity is characterized by a pH value greater than 2.5. In some of these embodiments, the pH controller maintains the desired acidity of the brine using an acid and further comprising an acid storage container. In some of these embodiments, the acid includes aqueous sulfuric acid. In some of these embodiments, the acid includes aqueous hydrochloric acid. In some of these embodiments, the oxidizer converts the iodide to molecular iodine using an aqueous bleach. In some of these embodiments, the oxidizer converts the iodide to elemental iodine using chlorine generated in situ. In some of these embodiments, the chlorine is obtained electrochemically from a portion of the brine. In some of these embodiments, the portion of the brine from which the chlorine is different from the brine provided to the oxidizer. In some of these embodiments, the chlorine is generated electrochemically from chloride ion present in the acidified brine in the oxidizer.

In some of these embodiments, the activated carbon is provided in a bed contained within a removable cartridge. In some of these embodiments, the activated carbon is provided in a slurry contained within a removable cartridge. In some of these embodiments, the activated carbon is provided in slurry contained within a removable cartridge.

Certain embodiments of the invention provide mobile modular iodine recovery systems and methods for recovering iodine from an aqueous brine containing iodide. Some of these embodiments comprise a head tank for maintaining a supply of the brine, a pH controller that acidifies brine received from the head tank to a desired acidity, an oxidizer that converts iodide in the acidified brine to molecular iodine, at least one activated carbon contactor module removably inserted into a stream of oxidized brine provided by the oxidizer, wherein the at least one activated carbon contactor module binds the molecular iodine to form the iodine complex and a transportable container enclosing the head tank, the pH controller and the oxidizer. In some of these embodiments, the container includes an inflow port for coupling the head tank to a flow of brine from the oilfield and a second port for returning iodide-depleted brine through a re-injection well of the oilfield.

In some of these embodiments, the brine is supplied at an elevated temperature and further comprising a generator for producing electrical energy from thermal energy of the brine. In some of these embodiments, the brine is supplied at an elevated pressure and further comprising a generator that is driven by the pressure of the brine and that produces electrical energy. Some of these embodiments comprise a pretreatment module for conditioning brine provided by the head tank. Some of these embodiments comprise a pretreatment module for conditioning brine provided by the head tank, wherein the pretreatment module includes a hydro-cyclone used to separate residual organics from the brine.

Certain embodiments of the invention provide systems and methods for recovering iodine from an aqueous brine. Some of these embodiments comprise selectively acidifying aqueous brine received from an oilfield, thereby obtaining acidified brine having a desired acidity. Some of these embodiments comprise oxidizing iodide in the acidified brine to produce elemental iodine in the acidified brine. Some of these embodiments comprise binding the molecular iodine to at least one activated carbon contactor module that is in contact with a stream of the acidified brine, thereby forming an iodine complex. In some of these embodiments, the oxidizing step is performed electrochemically. In some of these embodiments, the oxidizing step includes using a chemical oxidant. Some of these embodiments comprise separating hydrocarbons from the aqueous brine prior to the oxidizing step. In some of these embodiments, the hydrocarbons are separated using a hydrocyclone. In some of these embodiments, separating hydrocarbons from the aqueous brine includes pre-treating the aqueous brine with an emulsifier.

Although the present invention has been described with reference to specific exemplary embodiments, it will be evident to one of ordinary skill in the art that various modifications and changes may be made to these embodiments without departing from the broader spirit and scope of the invention. Accordingly, the specification and drawings are to be regarded in an illustrative rather than a restrictive sense.

What is claimed is:

1. A modular system for recovering iodine from an aqueous brine, comprising:
   an oil well for producing a flow of aqueous brine;
   a pipe connected to the oil well for carrying the flow of aqueous brine;
   a head tank connected to the pipe to receive a portion of the flow of aqueous brine passing through the pipe;
   a bypass mechanism disposed in the pipe to permit the head tank to capture said portion of the flow of aqueous brine passing through the pipe;
   a pH controller that acidifies brine received from the head tank to a desired acidity;
   an oxidizer that converts iodide in the acidified brine to elemental iodine; and
   at least one activated carbon contactor module removably inserted into a stream of oxidized brine provided by the oxidizer, wherein the at least one activated carbon contactor module binds the molecular iodine to form an iodine complex.

2. The system of claim 1, further comprising a depleted brine tank for receiving a stream of iodine-depleted brine from the at least one activated carbon contactor module, wherein the depleted brine tank returns the stream of iodine-depleted brine to a re-injection well.

3. The system of claim 2, wherein a desired rate of flow of brine is maintained through the pH controller, the oxidizer and the at least one activated carbon contactor module.

4. The system of claim 3, wherein the desired rate of flow of brine is maintained by one or more pumps.

5. The system of claim 3, wherein the pH controller, the oxidizer and the at least one activated carbon contactor module are provided in a plurality of tanks.

6. The system of claim 2, and further comprising a re-injection pump that pressurizes the iodide-depleted brine for return through the re-injection well.

7. The system of claim 1, wherein the brine includes residual organics.

8. The system of claim 7, wherein the residual organics comprise one or more of residual crude oil, dirt sludge, oil sludge and low molecular weight hydrocarbons.

9. The system of claim 7, wherein at least a portion of the residual organics are in suspension.

10. The system of claim 1, wherein the desired acidity is characterized by a pH value of about 3.

11. The system of claim 1, wherein the desired acidity is characterized by a pH value greater than 2.5.

12. The system of claim 1 further comprising an acid storage container, wherein the acid storage container provides acid to the pH controller for acidifying the brine to a desired acidity.

13. The system of claim 12, wherein the acid includes aqueous sulfuric acid.

14. The system of claim 12, wherein the acid includes aqueous hydrochloric acid.

15. The system of claim 1, wherein the oxidizer converts the iodide to elemental iodine using an aqueous bleach.

16. The system of claim 1, wherein the oxidizer converts the iodide to elemental iodine using in situ generated chlorine.

17. The system of claim 16, wherein the in situ generated chlorine is electrochemically generated from a portion of the brine.

18. The system of claim 17, wherein the portion of the brine from which the chlorine is generated is different from the brine provided to the oxidizer.

19. The system of claim 16, wherein the chlorine is generated electrochemically from chloride ion present in the acidified brine in the oxidizer.

20. The system of claim 1, wherein the activated carbon is provided in a bed contained within a removable cartridge.

21. The system of claim 1, wherein the activated carbon is provided in a slurry contained within a removable cartridge.

22. The system of claim 1, wherein the at least one activated carbon contactor module comprises a plurality of activated carbon contactor modules and further comprising a plurality of valves, each valve adapted to control flow of oxidized brine to a corresponding one of the plurality of activated carbon contactor modules, wherein the each valve is operable to selectively disable flow of the oxidized brine to the corresponding one activated carbon contactor module during attachment and detachment of the corresponding one activated carbon contactor module.

23. The system of claim 22, wherein the plurality of activated carbon contactor modules comprises two sets of iodine extraction cartridges and wherein the plurality of valves is configured to switch brine flow between the two sets of iodine extraction cartridges thereby enabling one set of iodine extraction cartridges to be replaced while the flow of oxidized brine is directed to the other set of iodine extraction cartridges.

24. A mobile modular iodine recovery system for producing an iodine complex from an aqueous brine containing iodide proximate to an oilfield, comprising:
   an oil well for producing a flow of aqueous brine;
   a pipe connected to the oil well for carrying the flow of aqueous brine;
   a head tank connected to the pipe to receive a portion of the flow of aqueous brine passing through the pipe;
   a bypass mechanism disposed in the pipe to permit the head tank to capture said portion of the flow of aqueous brine passing through the pipe;
   a pH controller that acidifies brine received from the head tank to a desired acidity;
   an oxidizer that converts iodide in the acidified brine to molecular iodine;
   at least one activated carbon contactor module removably inserted into a stream of oxidized brine provided by the oxidizer, wherein the at least one activated carbon contactor module binds the molecular iodine to form the iodine complex; and
   one or more transportable containers for housing the head tank, the pH controller and the oxidizer, wherein the one or more transportable containers include an inflow port for coupling the head tank to a flow of brine from the oilfield and a second port for returning iodide-depleted brine through a re-injection well of the oilfield.

25. The mobile modular iodine recovery system of claim 24, wherein the brine is supplied at an elevated temperature and further comprising a generator for producing electrical energy from thermal energy of the brine.

26. The mobile modular iodine recovery system of claim 24, wherein the brine is supplied at an elevated pressure and further comprising a generator that is driven by the pressure of the brine and that produces electrical energy.

27. The mobile modular iodine recovery system of claim 24, further comprising a pretreatment module for conditioning brine provided by the head tank.

28. The mobile modular iodine recovery system of claim 27, wherein the pretreatment module includes a hydro-cyclone used to separate residual organics from the brine.

29. The mobile modular iodine recovery system of claim 24, wherein the at least one activated carbon contactor module is removed from the stream of oxidized brine during elution of the molecular iodine.

30. The mobile modular iodine recovery system of claim 24, wherein molecular iodine is eluted from activated carbon in the at least one activated carbon contactor module and the activated carbon is regenerated in situ.

31. The mobile modular iodine recovery system of claim 24, wherein the at least one activated carbon contactor module comprises two activated carbon contactor modules, and further comprising a plurality of flow controls configured to switch the stream of oxidized brine between the activated carbon contactor modules, thereby enabling replacement of one of the activated carbon contactor modules while the other activated carbon contactor module receives the stream of oxidized brine.

* * * * *